US011455329B2

(12) United States Patent
Watanabe et al.

(10) Patent No.: US 11,455,329 B2
(45) Date of Patent: Sep. 27, 2022

(54) WEB-SOURCED DEVICE CONTROL

(71) Applicant: International Business Machines Corporation, Armonk, NY (US)

(72) Inventors: Kenta Watanabe, Soka (JP); Shunsuke Ishikawa, Shinjuku-Ku (JP); Asako Ono, Setagaya (JP); Hiroaki Uetsuki, Machida (JP); Yasuyuki Tominaga, Saitama (JP); Tohru Hasegawa, Tokyo (JP); Issei Yoshida, Setagaya-Ku (JP)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 16/537,774

(22) Filed: Aug. 12, 2019

(65) Prior Publication Data

US 2021/0049200 A1    Feb. 18, 2021

(51) Int. Cl.
*H04N 5/232*     (2006.01)
*H04N 1/00*      (2006.01)
(Continued)

(52) U.S. Cl.
CPC ............ *G06F 16/487* (2019.01); *G06F 9/542* (2013.01); *G06F 21/128* (2013.01); *H04N 1/0084* (2013.01); *H04N 1/00151* (2013.01); *H04N 1/00925* (2013.01); *H04N 5/23206* (2013.01); *H04N 5/23225* (2013.01); *H04N 5/23229* (2013.01); *H04N 5/23245* (2013.01); *H04W 4/021* (2013.01); *H04W 4/029* (2018.02); *H04N 2101/00* (2013.01)

(58) Field of Classification Search
CPC ...... G06F 16/487; G06F 9/542; G06F 21/128; G06F 21/629; G06F 9/4881; G06F 2221/2111; H04N 1/00151; H04N 1/0084; H04N 1/00925; H04N 5/23206; H04N 5/23225; H04N 5/23229; H04N 5/23245;
(Continued)

(56) References Cited

U.S. PATENT DOCUMENTS 7,272,403 B2 *   9/2007   Creamer .................. H04W 4/02
                                                        455/457
8,254,957 B2     8/2012   Ferren et al.
(Continued)

FOREIGN PATENT DOCUMENTS

JP    11296276 A       10/1999
JP    2010181509 A      8/2010
WO    2018058980 A1     4/2018

OTHER PUBLICATIONS

"The International Search Report and the Written Opinion of the International Searching Authority, or the Declaration", International application No. PCT/IB2020/057101, International filing date Jul. 28, 2020, dated Nov. 10, 2020, 9 pages.

(Continued)

*Primary Examiner* — Hung H Lam
(74) *Attorney, Agent, or Firm* — Stephen R. Yoder (57) ABSTRACT

A method, computer program product and computer system are provided to promote device usage compliance. A processor retrieves a current position for a device. A processor determines at least one nearby location based on the current position of the device. A processor retrieves search data regarding the at least one nearby location. A processor determines compliance information regarding the at least one location based, at least in part, on the search data. A processor configures the device based on the compliance information regarding the at least one location.

17 Claims, 6 Drawing Sheets

(51) Int. Cl.
*G06F 16/487* (2019.01)
*G06F 9/54* (2006.01)
*H04W 4/029* (2018.01)
*G06F 21/12* (2013.01)
*H04W 4/021* (2018.01)
*H04N 101/00* (2006.01)

(58) Field of Classification Search
CPC ... H04N 2101/00; H04W 4/021; H04W 4/029
See application file for complete search history.

(56) References Cited

U.S. PATENT DOCUMENTS

| | | |
|---|---|---|
| 8,787,941 B2 | 7/2014 | Kushtagi et al. |
| 9,084,214 B2 * | 7/2015 | Cook .................... H04W 48/04 |
| 9,185,135 B2 * | 11/2015 | Gupta .................... H04W 4/029 |
| 9,338,639 B2 * | 5/2016 | Wildner ............... H04B 1/3888 |
| 9,787,823 B2 | 10/2017 | Gruberman et al. |
| 2005/0277428 A1 * | 12/2005 | Nathan Brown . H04M 1/72463 455/456.3 |
| 2009/0082001 A1 * | 3/2009 | Rahul ............... H04M 1/72457 455/418 |
| 2013/0035063 A1 | 2/2013 | Fisk |
| 2020/0117687 A1 * | 4/2020 | Parulski ................. G06Q 50/14 |

OTHER PUBLICATIONS

"Cameraless—Camera Blocker", Google Play, Updated—May 20, 2019, 4 pages, <https://play.google.com/store/apps/details?id=com.manyera.simplecameradisable&hl=en_US>.

\* cited by examiner

FAQs about XXX Museum Collection and Buildings

FAQ 1. Can I take photographs (including digital cameras)?

We permit photographs to be taken of the works of art in the museum (permanent exhibits) during business hours (10:00-18:00), however you can't use a light source such as a flash.

FAQ 2. Can I record video of the exhibits?

We permit video during business hours.

FAQ 3. Can I use the images or video of the works I took pictures in this Museum?

Please see "Copyright and Policy".

FIG. 3

| Device Control Table | | | | | | | |
|---|---|---|---|---|---|---|---|
| No. | Area | Restriction | Availability | Business Hrs. | Flash | Recording | Copyright |
| 1 | XX Museum | Camera | Yes | 10:00-18:00 | No | - | URL: xzy.com |
| 2 | XX Movie Theater | Movie | No | 09:00-23:00 | No | No | URL: abc.com |
| ... | ... | ... | ... | ... | ... | ... | ... |

WEB-SOURCED DEVICE CONTROL

BACKGROUND OF THE INVENTION

The present invention relates generally to the field of device control, and more particularly to controlling access to features of the mobile devices.

Device control is the practice of restricting or permitting access to a user various functions and other tasks provided to a device. For example, a device may be configured to permit a user to install peripheral devices, such as storage devices or printers, or may permit or limit a user access to software-based features, such as outgoing network traffic. In general, device control is used to restrict a user's ability to perform certain tasks or operations with the device.

SUMMARY

Embodiments of the present invention provide a method, system, and program product to promote device usage compliance. A processor retrieves a current position for a device. A processor determines at least one nearby location based on the current position of the device. A processor retrieves search data regarding the at least one nearby location. A processor determines compliance information regarding the at least one location based, at least in part, on the search data. A processor configures the device based on the compliance information regarding the at least one location.

DETAILED DESCRIPTION

Typical device control restricts user access to devices by access rules. Typically, the access rules are predetermined and apply to a vast majority of users of the controlled devices. As such, prior solutions to device control are static and require a manual change by a system administrator. Embodiments of the present invention provide improvements to prior solutions of device control by offering an automated mechanism to find and detect compliance information from third-party sources, such as web sites, and automatically generating and applying device controls rules based on the detected compliance information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIG's illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIG's. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
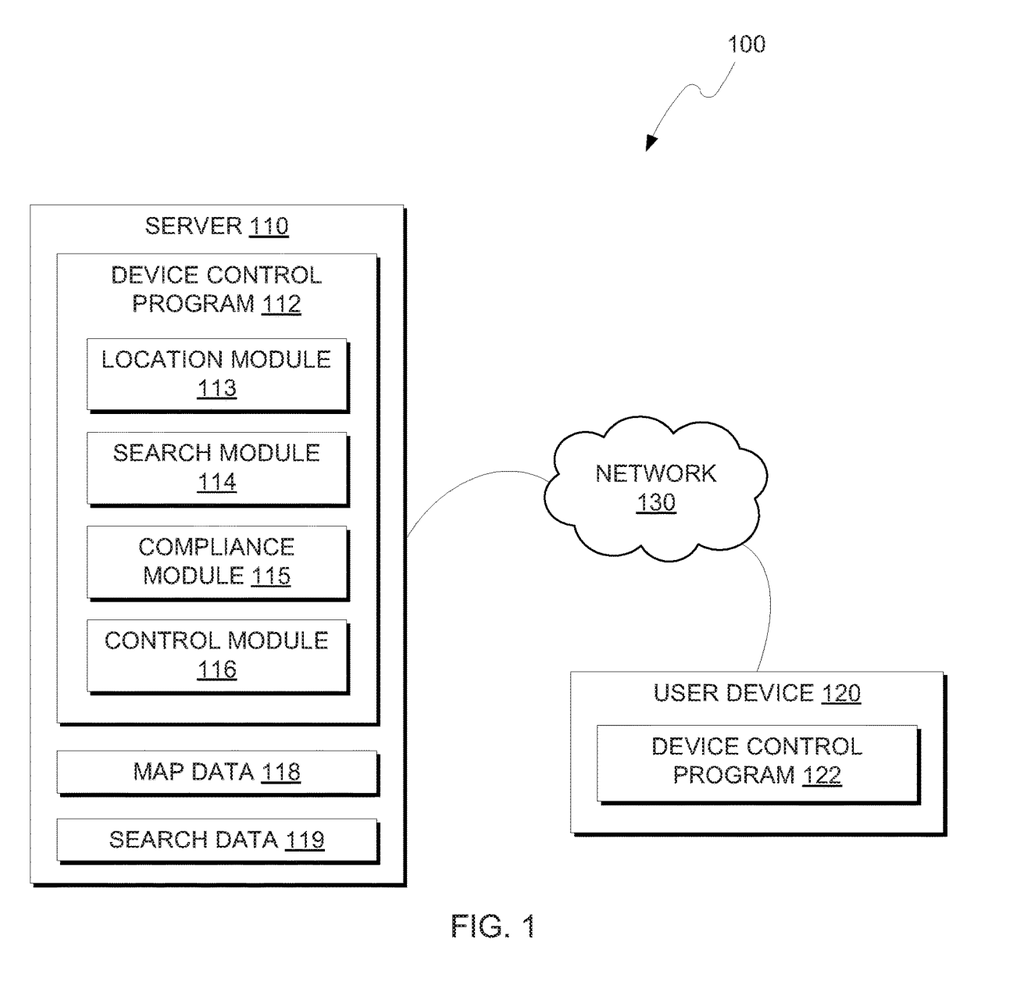
FIG. 1 is a functional block diagram illustrating a networked environment, in accordance with an embodiment of the present invention.

The present invention will now be described in detail with reference to the FIG's. FIG. 1 is a functional block diagram illustrating networked environment, generally designated 100, in accordance with one embodiment of the present invention. Networked environment 100 includes server 110 and user device 120 connected over network 130. Server 110 includes device control program 112, map data 118 and search data 119. Each user device of user device 120 include device control program 122. Device control program 112 and 122 include location module 113, search module 114, compliance module 115 and control module 116.

In various embodiments of the present invention, server 110 and user device 120 are each a computing device that can be a standalone device, a server, a laptop computer, a tablet computer, a netbook computer, a personal computer (PC), or a desktop computer. In another embodiment, server 110 and user device 120 each represent a computing system utilizing clustered computers and components to act as a single pool of seamless resources. In general, server 110 and user device 120 can be any computing device or a combination of devices with access to map data 118 and search data 119 and is capable of executing device control program 112. Server 110 and user device 120 may include internal and external hardware components, as depicted and described in further detail with respect to FIG. 6.

In this exemplary embodiment, device control program 112, location module 113, search module 114, compliance module 115, control module 116, map data 118 and search data 119 are stored on server 110. However, in other embodiments, device control program 112, location module 113, search module 114, compliance module 115, control module 116, map data 118 and search data 119 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between server 110 and user device 120, in accordance with a desired embodiment of the present invention.

In various embodiments, user device 120 is a device in use by a user, such as, but not limited to, a mobile phone, a camera, a video, a recording terminal, and the like. Device control program 112 controls or otherwise administered access to features provided by user device 120. Device control program 112 includes location module 113 to determine the location of a user device. The location module 113 communicates with the user device 120 to acquire position information of user device 120. For example, device control program 112 retrieves user device 120 location by a one or more sensors, such as a global positioning system (GPS), communicatively coupled to a user device.

Based on the current location of the user device, device control program 112 determines one or more nearby locations. Locations may be any building, storefront or other area associated with the location such as a store, place of business, park, or any other space. Device control program 112 retrieves the current location of user device 120 and searches map data 118 to determines nearby locations, as well as any keywords that will be used in identifying the nearby locations. Map data 118 includes a computerized two-dimensional map information that provides a database capable for searching an area for nearby locations. For example, based on latitude and longitude retrieved from user device 120, map data 118 provides nearby locations, such as place of businesses, governmental buildings, and the like.

In various embodiments, device control program 112 includes search module 114. Based on the locations determined by location module 113, search module 114 polls search data 119 for information regarding the locations. Search data 119 includes various databases or other data stores regarding the policies and rules associated with each location. In some embodiments, search module 114 performs a keyword search for the location using one or more web-based search engines. In other embodiments, device control program 112 performs one or more keyword searches prior to user device 120 being determined to enter or being nearby the location. In such an embodiment, search module 114 searches for various known locations, storing the search results in search data 119. Search data 119 includes text, images, or video information related to the location or keywords associated with the location (e.g., the search includes results for "XX Theater" for the location and related keywords such as "XX movie" or "movie"). In some scenarios, search data 119 includes database entries retrieved from a website operated by someone associated with the owner of the property of the location (e.g., the search results from a website owned and operated by "XX Theater". In other scenarios, search data 119 includes search results from other domains and websites related with the location or associated keywords, such as, but not limited to, comments, tweets or bulletin board information, and the like from visitors of the location.

In various embodiments, compliance module 115 analyzes search data 119 to determine device compliance rules for user device 120, for a given location. For example, compliance module 115 identifies all entries for a location. Compliance module 115 performs natural language processing (NLP) to identify the content and context of each entry associated with the location. Compliance module 115 identifies entries whose content is associated with one or more device usage rules associated with the location. For example, compliance module 115 identifies all entries in search data 119 for a movie theater that includes content related to the use of a camera at the movie theater. Based on the NLP of the identified search data 119 for the location regarding camera usage, compliance module 115 determines a compliance rule associated with the location, as discussed herein as well as in regard to FIGS. 3 and 4.

Based on the determined compliance rules from compliance module 115, control module 116 issues one or more commands or operations to configure user device 120 in order conform to the determined rules by compliance module 115. For example, search data 119 includes entries indicating that audio recordings are prohibited at "Park Y". In this scenario, control module 116 configures user device 120 such that audio recordings are disabled when user device 120 is at "Park Y".

In various embodiments, user device 120 includes device control program 122. In some scenarios, device control program 122 of user device 120 receives commands from device control program 112 regarding usage or access permission for user device 120. In other scenarios, one or more of the features regarding location module 113, search module 114, compliance module 115 or control module 116 may be performed by device control program 122 of user device 120.

Figure 2:
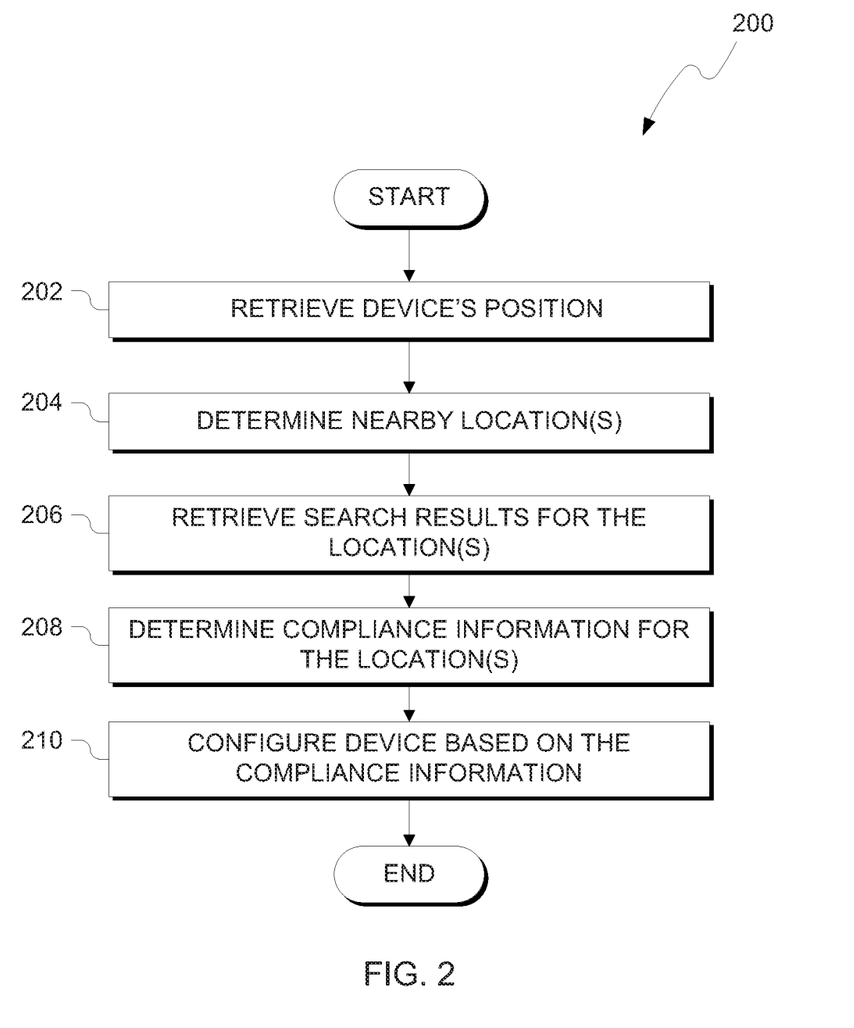
FIG. 2 illustrates operational processes of a device control program, on a computing device within the environment of FIG. 1, in accordance with an embodiment of the present invention.

FIG. 2 is a process flow of the device control program 112, generally designated 200 according to the present invention. In process 202, device control program 112 retrieves the position of user device 120. In some scenarios, user device 120 includes one or more sensors, such as a GPS sensor, to determine a position of the device. In process 204, device control program 112 determines a location associated with or nearby the position of user device 120. Map data 118 includes entries for various locations such as places of business or public spaces. Device control program 112 identifies a nearby location associated with the position of user device 120.

In process 206, device control program 112 retrieves search data 119 associated with the determined nearby location. Based on the locations' names, and any other associated keywords, device control program 112 retrieves any articles, web pages or other information stored in search data 119. In process 208, device control program 112 determines compliance information for the location based on the retrieved information in search data 119. Based on NLP of the retrieved search data 119 for the location, device control program 112 determines the content of each entry. For entries with identified compliance information, device control program 112 determines one or more access or usage rules for user devices at the location. In some embodiments, device control program 112 performs sentiment analysis to search data 119 entries related to the location to determine compliance information.

In process 210, device control program 112 configures user device 120 based on the determined compliance information. For example, if a location has been determined to have compliance information regarding no flash photography, device control program 112 configures user device 120 to disable the flash of user device 120. One of ordinary skill in the art will appreciate that a variety of compliance information may be determined and utilized, based on the retrieved search data for a given location, without deviating from the invention. Compliance information includes rules, permissions, or exclusions regarding the operation or use of an electronic device and any features that may be provided by the electronic device such as, but not limited to, usage or restriction of cameras, flash photography, video recording, image recording, audio recording. In some scenarios, device control program 112 generates compliance information regarding the usage, sharing, publication or other copyright related information, such as a copyright notice posted on a website associated with the location, regarding media taken at the location.

Figure 3:
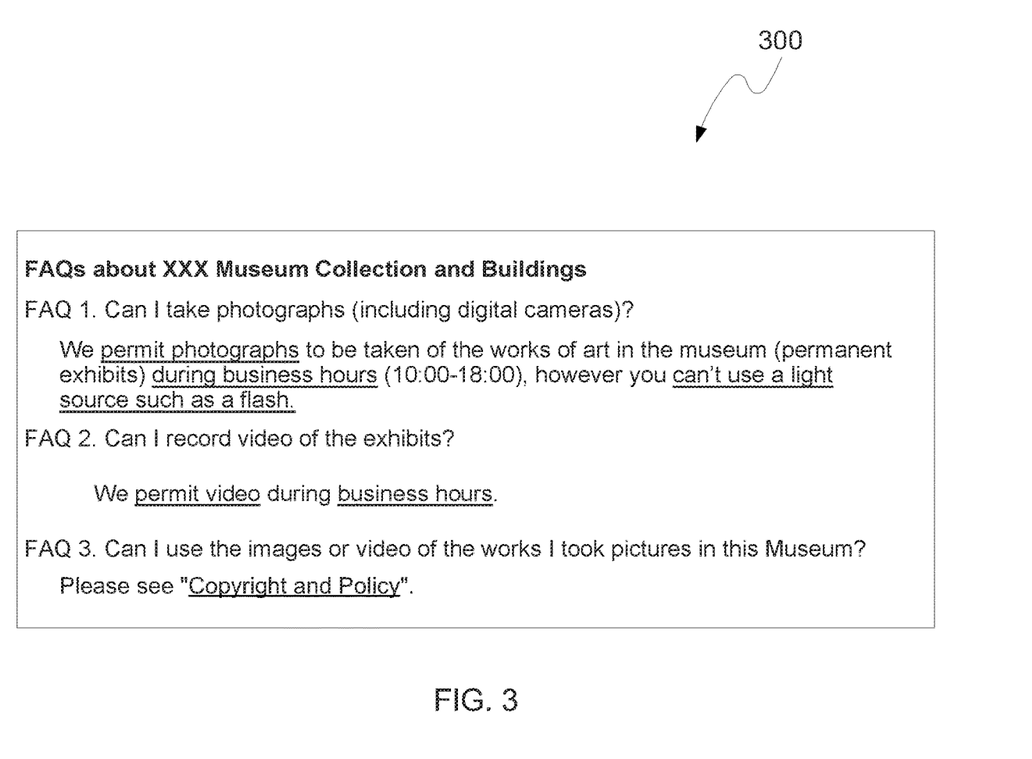
FIG. 3 illustrates an example excerpt from a location's website, in accordance with an embodiment of the present invention.

FIG. 3 includes an example excerpt 300 from a location's website. Compliance module 115 of device control program 112 identifies that the FAQ includes content regarding the use of cameras by performing NLP to determine the content and context of excerpt 300. In this example, device control program 112 retrieves excerpt 300 by retrieving search results found by search module 114 from XX Museum's website. In some embodiments, compliance module 115 is configured to find and identify expressions that forbid or restrict certain device functions. For example, device control program 112 identifies phrases with context similar to "do not use . . . " or "not allowed . . . " to identify restrictions. In some scenarios, device control program 112 identifies other information such as business hours.

Figure 5:
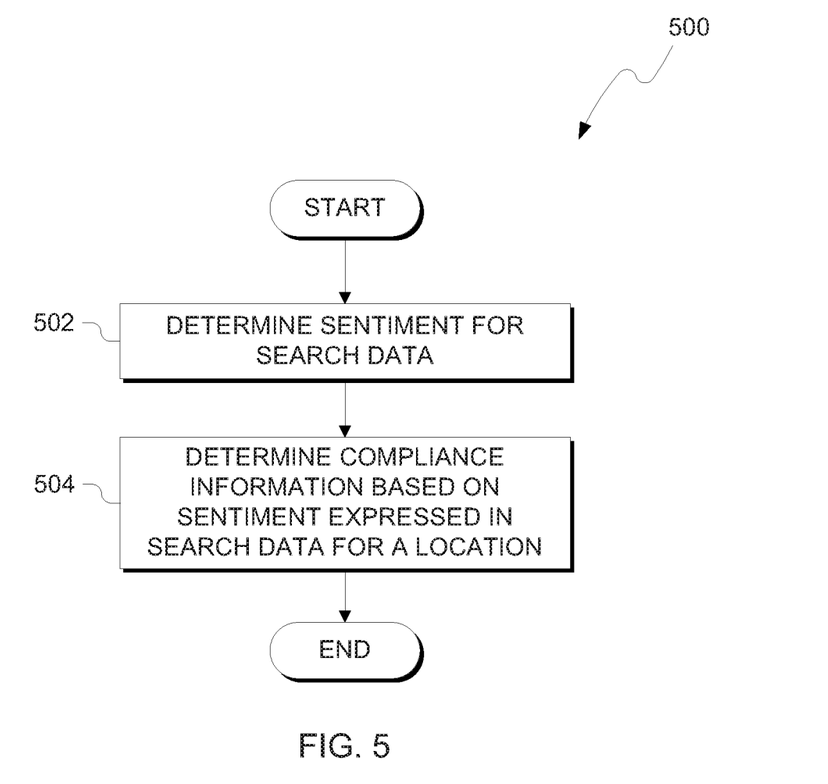
FIG. 5 illustrates operational processes of a device control program performing sentiment analysis, on a computing device within the environment of FIG. 1, in accordance with an embodiment of the present invention.

FIG. 5 illustrates sentiment analysis processes, generally designated as 500, of search data 119 by compliance module 115. In some scenarios, "soft" or indirect restrictions may be identified as compliance information. For example, statements such as "We do not advise . . . " are included in compliance information for the location. In such scenarios, sentiment analysis determines that a negative connotation is associated with this feature and therefore user device 120 may be configured to restrict the usage associated with the negative sentiment.

In process 502, compliance module 115 determines a sentiment associated with entries in search data 119. In some scenarios, user generated content such as social network messages or comments and reviews for the location may be analyzed for compliance information. In process 504, if a negative sentiment is associated with a particular device use, then compliance module 115 determines a usage rule for the identified function. For example, during a search for keywords for a location, search module 114 finds a social network message that states, "I was yelled at when I took a picture using a flash at the X museum". Based on sentiment analysis, compliance module 115 determines a negative expression was used regarding "Flash Photography". In response, compliance module 115 generates a usage rule that would disable flash for visitors of the museum.

Figure 4:
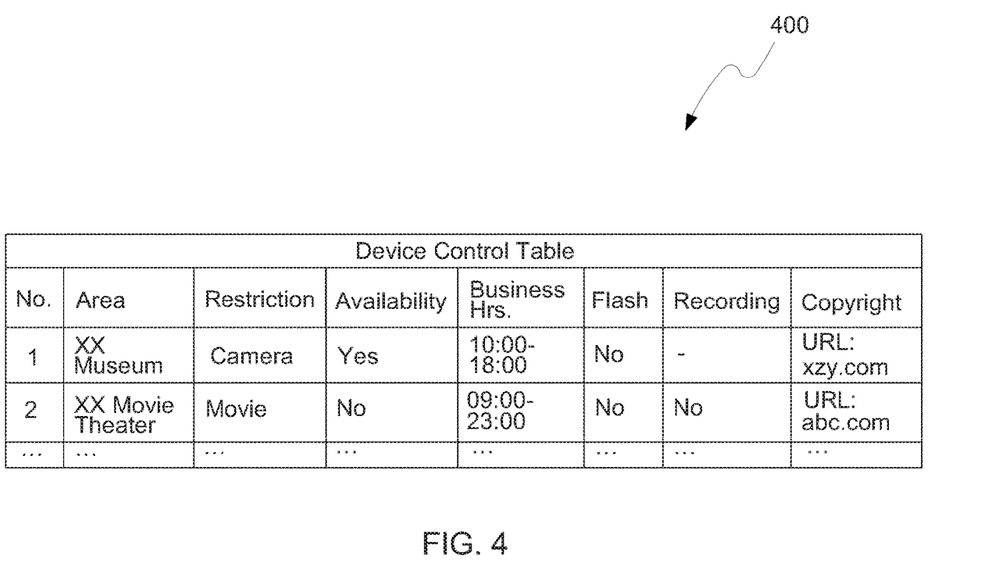
FIG. 4 depicts an example device control table, in accordance with an embodiment of the present invention.

FIG. 4 depicts an example device control table 400. Device control table 400 includes various usage control records. In this example, each is listed in order from an area close to the position of user device 120. In this example, user device 120 is currently closest to XX Museum. As a user's position changes, device control table 400 updates to reflect the closest locations. In scenarios where conflicts occur for nearby locations, the closest locations compliance information is used.

Based on search data 119, device control table 400 includes various usage restrictions for each location. In this example, device control table 400 includes information to indicate that cameras are permitted at XX Museum, however only between 10:00-18:00 however, a flash and copyright restrictions are determined. Similarly, in the XX Movie theater, that video is restricted. For locations with copyright information regarding usage and sharing of images taken at the location, the URL includes details of the copyright policy for users. be notified to the user.

Based on device control table 400, user device 120 is continuously configured to enforce the usage rights of device control table 400. Device control program 112 communicates with the user device 120 and transmits a control signal or other commands to the user device 120 in order to match the compliance items in the device control table 410. When user device 120 changes configurations based on device control table 400, the user is notified of the change.

In some embodiments and scenarios, user device 120 may be located in a high-rise building with multiple floors, with each floor having different locations or businesses with separated compliance information. In such scenarios, in addition to the position information, compliance information for each floor is included in device control table 400. Additionally, some locations may include a collection or group of smaller areas, such as a mall or shop with multiple vendors. Compliance information for each small area is added to the device control table 410 to enable different device control for each small area.

In some embodiments, device control program 112 continues usage restrictions after a user's position leaves a location with compliance information. For example, a location has a usage restriction regarding of content generated (i.e., photos taken) at the location, where the photos are permitted to be taken but cannot be published. In such embodiments, device control program 122 includes metadata in images taken at the location identifying these restrictions on publication. When uploading content to other services (e.g., publishing the photo to a social network), device control program 122 checks the metadata of images being sent by user device 120. If device control program 122 detects images or other files with the restriction metadata, then device control program 122 prevents the sharing of the image and informs the user of the error.

Figure 6:
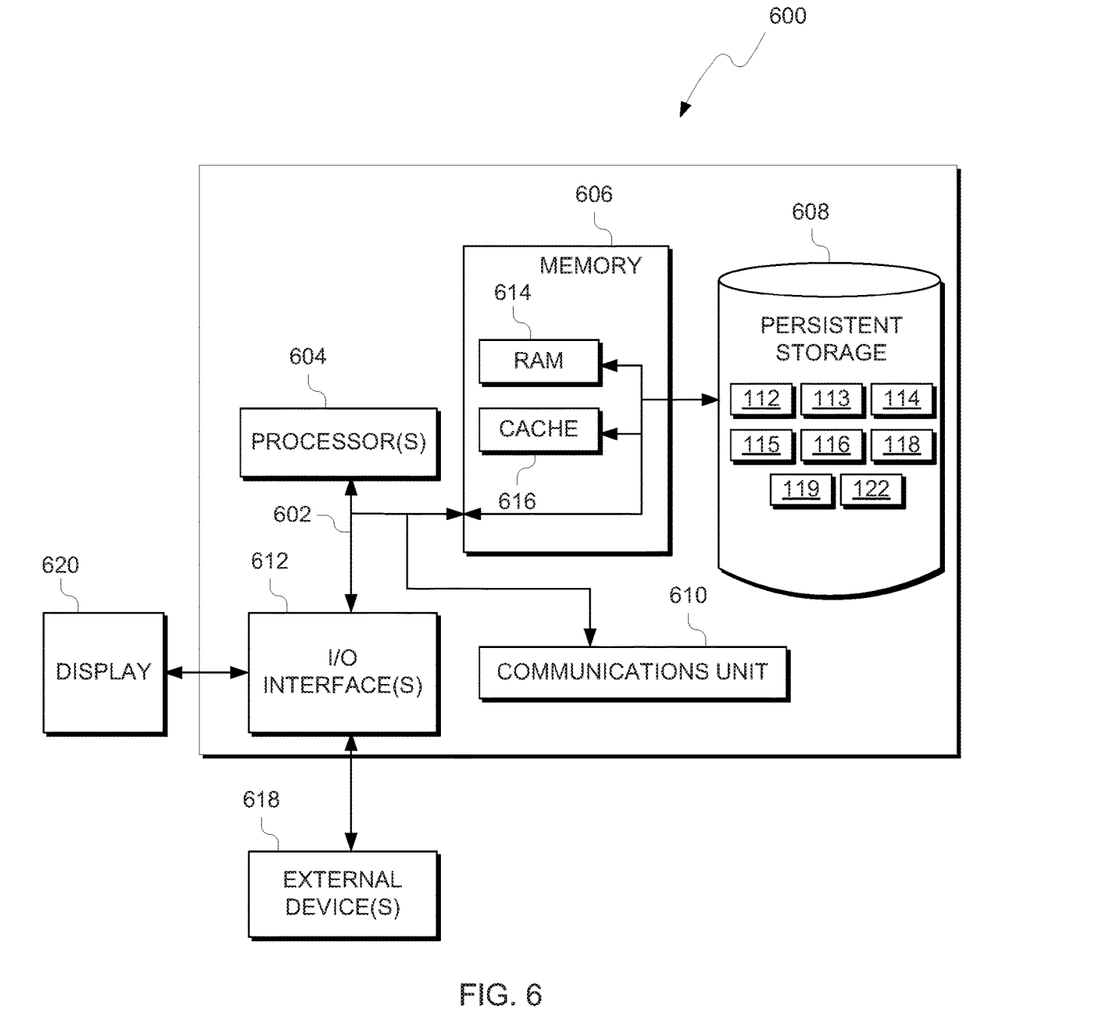
FIG. 6 depicts a block diagram of components of the computing device executing a device control program, in accordance with an exemplary embodiment of the present invention.

FIG. 6 depicts a block diagram, 600, of components of server 110 and user device 120, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server 110 and user device 120 each include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Device control program 112, location module 113, search module 114, compliance module 115, control module 116, map data 118, search data 119 or device control program 122 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 130. In these examples, communications unit 610 includes one or more network interface cards. Communications unit 610 may provide communications through the use of either or both physical and wireless communications links. Device control program 112, location module 113, search module 114, compliance module 115, control module 116, map data 118, search data 119 and device control program 122 may be downloaded to persistent storage 608 through communications unit 610.

I/O interface(s) 612 allows for input and output of data with other devices that may be connected to server 110 or user device 120. For example, I/O interface 612 may provide a connection to external devices X18 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., device control program 112, location module 113, search module 114, compliance module 115, control module 116, map data 118, search data 119 and device control program 122, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
    retrieving, by one or more processors, a current position for a device;
    determining, by the one or more processors, at least one nearby location based on the current position of the device;
    retrieving, by the one or more processors, search data regarding the at least one nearby location, wherein the search data includes a user-generated comment regarding the at least one nearby location;
    determining, by the one or more processors, compliance information regarding the at least one nearby location based, at least in part, on the search data; and
    configuring, by the one or more processors, the device based on the compliance information regarding the at least one nearby location.

2. The method of claim 1, the method further comprising:
    determining, by the one or more processors, a sentiment expressed by the user-generated comment regarding the at least one nearby location.

3. The method of claim 2, wherein the compliance information regarding the at least one nearby location is determined based, at least in part, on the sentiment expressed by the user-generated comment regarding the at least one nearby location.

4. The method of claim 1, wherein the search data includes a copyright notice regarding media collected at the at least one nearby location.

5. The method of claim 4, the method further comprising:
    receiving, by the one or more processors, an indication of a user of the device recording media at the at least one nearby location;
    storing, by the one or more processors, metadata in regard to the user-recorded media, wherein the metadata indicates the copyright notice;
    in response to the user of the device uploading the user-recorded media, identifying, by the one or more processors, the copyright notice; and
    in response to the copyright notice including a restriction that is applicable to the user-recorded media, restricting, by the one or more processors, the uploading of the user-recorded media.

6. The method of claim 1, wherein the compliance information includes a restriction of one or more of the following features of the device: camera recording, flash usage, video recording, image recording, or audio recording.

7. A computer program product comprising:
    one or more computer-readable storage media and program instructions stored on the one or more computer-readable storage media, the program instructions comprising:
        program instructions to retrieve a current position for a device;
        program instructions to determine at least one nearby location based on the current position of the device;
        program instructions to retrieve search data regarding the at least one nearby location, wherein the search data includes a user-generated comment regarding the at least one nearby location;
        program instructions to determine compliance information regarding the at least one nearby location based, at least in part, on the search data; and
        program instructions to configure the device based on the compliance information regarding the at least one nearby location.

8. The computer program product of claim 7, the program instructions further comprising:
    program instructions to determine a sentiment expressed by the user-generated comment regarding the at least one nearby location.

9. The computer program product of claim 8, wherein the compliance information regarding the at least one nearby location is determined based, at least in part, on the sentiment expressed by the user-generated comment regarding the at least one nearby location.

10. The computer program product of claim 7, wherein the search data includes a copyright notice regarding media collected at the at least one nearby location.

11. The computer program product of claim 10, the program instructions further comprising:
    program instructions to receive an indication of a user of the device recording media at the at least one nearby location;
    program instructions to store metadata in regard to the user-recorded media, wherein the metadata indicates the copyright notice;
    in response to the user of the device uploading the user-recorded media, program instructions to identify the copyright notice; and
    in response to the copyright notice including a restriction that is applicable to the user-recorded media, program instructions to restrict the uploading of the user-recorded media.

12. The computer program product of claim 7, wherein the compliance information includes a restriction of one or more of the following features of the device: camera recording, flash usage, video recording, image recording, or audio recording.

13. A computer system comprising:
    one or more computer processors;
    one or more computer readable storage media; and
    program instructions stored on the computer readable storage media for execution by at least one of the one or more processors, the program instructions comprising:
        program instructions to retrieve a current position for a device;
        program instructions to determine at least one nearby location based on the current position of the device;
        program instructions to retrieve search data regarding the at least one nearby location, wherein the search data includes a user-generated comment regarding the at least one nearby location;
        program instructions to determine compliance information regarding the at least one nearby location based, at least in part, on the search data; and program instructions to configure the device based on the compliance information regarding the at least one nearby location.

14. The computer system of claim 13, the program instructions further comprising:
program instructions to determine a sentiment expressed by the user-generated comment regarding the at least one nearby location.

15. The computer system of claim 14, wherein the compliance information regarding the at least one location is determined based, at least in part, on the sentiment expressed by the user-generated comment regarding the at least one nearby location.

16. The computer system of claim 13, wherein the search data includes a copyright notice regarding media collected at the at least one nearby location.

17. The computer system of claim 16, the program instructions further comprising:
program instructions to receive an indication of a user of the device recording media at the at least one nearby location;
program instructions to store metadata in regard to the user-recorded media, wherein the metadata indicates the copyright notice;
in response to the user of the device uploading the user-recorded media, program instructions to identify the copyright notice; and
in response to the copyright notice including a restriction that is applicable to the user-recorded media, program instructions to restrict the uploading of the user-recorded media.

\* \* \* \* \*